United States Patent
Glass et al.

(10) Patent No.: US 9,219,819 B1
(45) Date of Patent: Dec. 22, 2015

(54) LOAD BALANCING AND SHARING OF CONTEXTUAL INFORMATION IN A MULTI-VENDOR AND/OR MULTIPLE CONTACT CENTER ENVIRONMENT

(71) Applicant: CafeX Communications, Ltd., Cardiff (GB)

(72) Inventors: Kevin J. Glass, Cardiff (GB); David Watts, Cardiff (GB)

(73) Assignee: CAFEX COMMUNICATIONS, LTD., Cardiff (GB)

( * ) Notice: Subject to any disclaimer, the term of this patent is extended or adjusted under 35 U.S.C. 154(b) by 0 days.

(21) Appl. No.: 14/723,622

(22) Filed: May 28, 2015

Related U.S. Application Data (60) Provisional application No. 62/004,629, filed on May 29, 2014.

(51) Int. Cl.
| | | |
|---|---|---|
| *H04M 3/00* | (2006.01) | |
| *H04M 5/00* | (2006.01) | |
| *H04M 3/523* | (2006.01) | |
| *H04M 3/51* | (2006.01) | |
| *H04N 7/14* | (2006.01) | |

(52) U.S. Cl.
CPC .......... *H04M 3/5234* (2013.01); *H04M 3/5166* (2013.01); *H04M 3/5191* (2013.01); *H04N 7/141* (2013.01)

(58) Field of Classification Search
CPC ............ H04M 3/5191; H04M 3/5183; H04M 3/5166; H04M 3/5232; H04M 3/5234; H04M 3/51
USPC ............. 379/265.09, 265.05, 265.01, 265.02, 379/266.07, 265.11, 264, 268, 265.12
See application file for complete search history.

(56) References Cited

U.S. PATENT DOCUMENTS

| | | | | |
|---|---|---|---|---|
| 7,023,979 B1 * | 4/2006 | Wu | ...................... | H04M 3/5233 |
| | | | | 379/265.11 |
| 7,106,850 B2 * | 9/2006 | Campbell | ........... | H04M 3/5125 |
| | | | | 370/352 |
| 7,149,303 B1 | 12/2006 | Laurinavichus | | |
| 2006/0109976 A1 | 5/2006 | Sundaram et al. | | |
| 2011/0110364 A1 | 5/2011 | Fried et al. | | |
| 2012/0134488 A1 | 5/2012 | Chen et al. | | |

OTHER PUBLICATIONS

International Search Report and Written Opinion for PCT/IB2015/054035 dated Sep. 2, 2015.

* cited by examiner

*Primary Examiner* — Thjuan K Addy
(74) *Attorney, Agent, or Firm* — Robert J. Sacco; Fox Rothschild, LLP (57) ABSTRACT

A method and system for load balancing and sharing of context information in a multi-vendor and/or multi-contact center environment. The arrangements utilize a generic client-side API in conjunction with a set of back end-frameworks to facilitate support of disparate contact center solutions. Accordingly a single client side application can be used to support multiple vendor contact center solutions. Further, the system enables an enterprise to leverage an instance of a visual IVR server, which works in conjunction with a contact center that supports such visual IVR server, so that it can also be used with contact center solutions that do not provide direct access to IVR scripts. The system also facilitates use of agent availability statistics to intelligently route customer calls to the most available agent across multiple vendor solutions or where instances of a single vendor solution are deployed in different data centers.

20 Claims, 4 Drawing Sheets

LOAD BALANCING AND SHARING OF CONTEXTUAL INFORMATION IN A MULTI-VENDOR AND/OR MULTIPLE CONTACT CENTER ENVIRONMENT

RELATED APPLICATIONS AND CLAIMS OF PRIORITY

This patent application claims the benefit of U.S. Provisional Patent Application No. 62/004,629 filed May 29, 2014, the disclosure of which is fully incorporated herein by reference.

BACKGROUND OF THE INVENTION

1. Statement of the Technical Field

The inventive arrangements relate to computer systems and more particularly to computer infrastructure for load balancing and sharing data and media as between mobile/web applications and corporate contact center.

2. Description of the Related Art

Interactive voice response (IVR) systems are commonly used to facilitate a human interaction with an enterprise computer system by way of a telephone or mobile communication device. In such systems, customers interact with the host computer system using a telephone keypad or by speech recognition. These systems allow users to service their own interface needs without a human operator by following an IVR dialogue. The IVR dialogue is usually a pre-recorded or computer generated audio dialogue that is defined by an IVR tree. Conventional IVR systems as described herein allow users to interface with the host computer system by means of a series of simple interactions. These interactions usually involve the use of DTMF tones and/or voice recognition algorithms to determine user selections. Visual interactive voice response (visual IVR) systems are conceptually similar to conventional IVR systems, but are enhanced insofar as they also allow users to interact with the host computer through a series of visual menus. Visual IVR systems take the process to a higher level by allowing the user to make service selections through a menu displayed on a smart-phone or other type of mobile device with display capability. Because of their importance to the overall success of an enterprise, companies make substantial investments in their IVR systems to ensure that they provide for a pleasant user experience and cost-effective processing of user service needs.

In a conventional IVR system, the customer or user places a call to a particular entity. When the call is received, the IVR system executes a series of automated scripts and then responds to simple user commands to satisfy the customer's service requirements. A visual IVR system works in a similar manner with the web application connecting into the IVR system to execute the relevant scripts. In many instances of either the IVR or VIVR interaction, the customer may determine that they need to speak with a human call center agent. Accordingly, the IVR system will receive certain user inputs in response to the IVR script and then establish the necessary call to a human agent in a contact center. Once a connection is made to the human agent in the contact center, use of the IVR system generally terminates with respect to that particular customer, who then continues dealing only with the human operator.

SUMMARY OF THE INVENTION

Embodiments of the invention concern method and systems for load balancing and sharing of context information in a multi-vendor and/or multi-contact center environment. The inventive arrangements utilize a generic client-side API in conjunction with a set of back end-frameworks to facilitate support of disparate contact center solutions. Accordingly a single client side application can be used to support multiple vendor contact center solutions. Further, the system enables an enterprise to leverage an instance of a visual IVR server (which works in conjunction with a contact center that supports such visual IVR server) so that it can also be used with contact center solutions that do not provide direct access to IVR scripts. The system also facilitates use of agent availability statistics to intelligently route customer calls to the most available agent across multiple vendor solutions (or where instances of a single vendor solution are deployed in different data centers).

Context information is shared among a plurality of communication sessions, and among a plurality of end points in an enterprise contact center. A correlation ID is assigned to the communication session to uniquely identify communication sessions in progress with respect to a particular web client. The correlation ID allows the communication session to be uniquely identified relative to other communication sessions supported by the enterprise communication system to other web clients. Once assigned, the correlation ID is used throughout the enterprise computer system to specify context information for the communication session. More particularly, the correlation ID is used to specify the relevant context information or data pertaining to a particular communication session (or web client). The relevant context information is thus made available to each of a plurality of end points in the enterprise computer system which interacts directly or indirectly with the web client. The plurality of end points in the enterprise computer system can include a VIVR/context server, a web application of the enterprise computer system, an SIP web gateway of the computer system, at least one of the contact center servers, and at least one contact center agent computer.

According to one aspect, the inventive arrangements facilitate intelligent load balancing as between the plurality of contact center servers based on queue statistics. The queue statistics are used to determine which of the plurality of contact center servers a communication session should be routed. Thereafter, the relevant context information for the communication session can be identified or specified to the selected one of the contact center servers by utilizing the correlation ID.

According to another aspect, the inventive arrangements facilitate automatically routing a web client to a particular one of the plurality of contact centers servers based on a customer service requirement of the communication session. In such a scenario, the customer service requirement can be determined by criteria which can include context information specified by the correlation ID.

According to a further aspect, the inventive arrangements facilitate automatically routing a web client communication session to a particular one of the plurality of contact center servers based on a technical capability requirement of the communication session. The technical capability need for the particular communication session can be determined based on context information specified by the correlation ID.

The inventive arrangements described herein can facilitate the sharing of information as between the plurality of contact center servers, wherein the correlation ID is used to specify context information associated with the specific communication session with the web client. In some scenarios, the plurality of contact centers may utilize different vendor technology solutions to implement technologically different contact center solutions in each of the contact center servers. However, the necessary context information can be made available to each vendor solution using the correlation ID.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Visual IVR systems are used today to replace or augment existing IVR systems. Visual IVR systems can either fast-track the process of identifying the appropriate contact center agent or remove the need for contact center agent altogether. A simplified architecture of an IVR system shown in FIG. 1 includes a plurality of end-user devices such as computer 104, smart-phone 106 and conventional telephone 108. The end user devices communicate with an IVR server 102 (which may be a visual IVR server) through IP network 116. Communications with the IP network 116 are facilitated by using public internet 112, circuit switched network 114, and/or SIP gateways 118. End users can establish communications (voice calls and/or video calls) with contact agents (not shown) in a contact center 110 by interacting with an IVR dialog implemented by IVR server 102. Communications with the IVR server are implemented through IP network 116. Suitable telephone equipment and workstations are provided at the contact center to facilitate communications with contact agents after customers or end-users have made the necessary responses to the IVR dialog.

Figure 1:
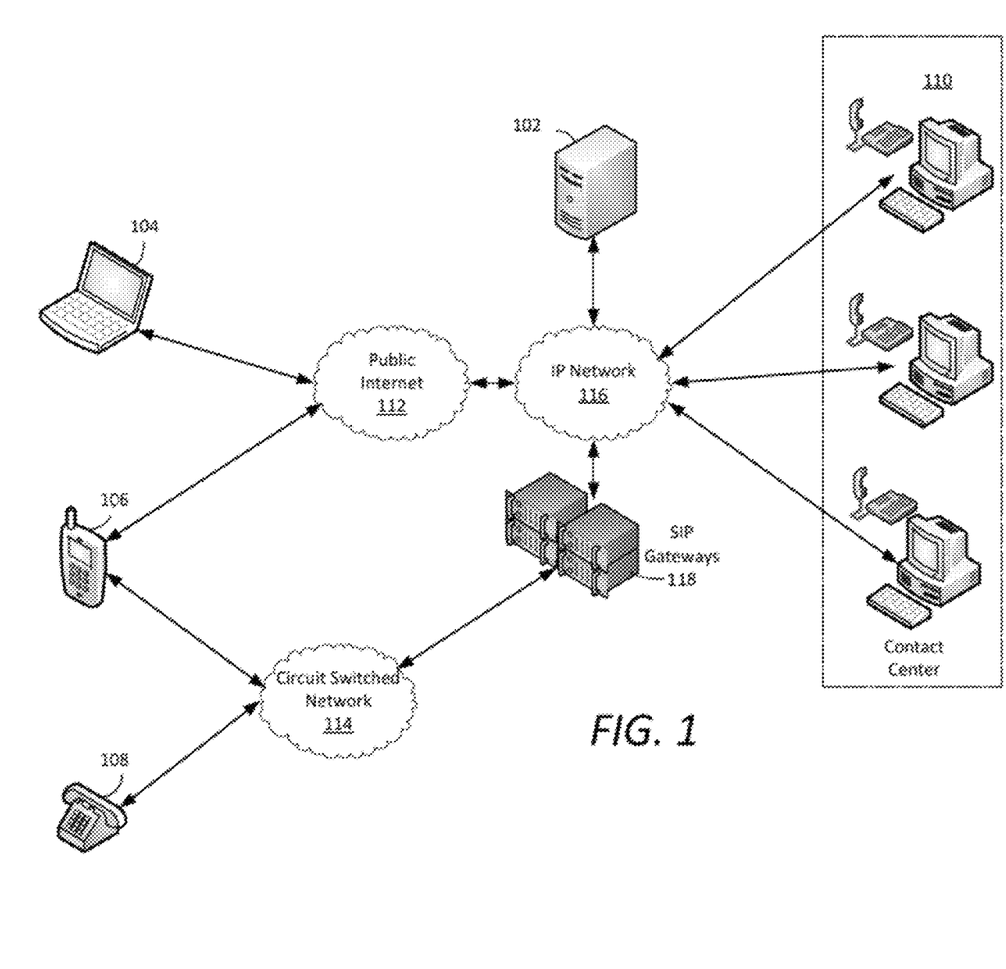
FIG. 1 is a drawing that is useful for understanding architecture of a visual IVR system.

A conventional IVR system, such as the one that is shown in FIG. 1, can work well but also is known to have certain limitations. For example, it is well known that contact center vendors provide differing and often proprietary mechanisms for the graphical representation of corporate IVR systems. Similarly, contact center vendors provide differing and proprietary mechanisms for the transfer of contextual information from external software applications. These proprietary arrangements can necessitate the design and development of customized web/mobile applications for each vendor's contact center. They can also necessitate the providing of a proprietary application programming interface (API) in a deployed mobile application. The inventive arrangements overcome these limitations by utilizing a common abstracted API in a mobile application, together with a sophisticated rules-driven context engine on the enterprise side. The invention allows enterprises to build web/mobile applications that are independent of the capability and interfaces supported by the underlying contact center infrastructure. Consequently, large enterprises can have the ability to concurrently utilize contact center infrastructures provided by various different vendors without additional burden or cost to their web/mobile application development. This approach also allows contact center vendors to be replaced as needed without impacting the customer facing applications (i.e., existing mobile applications deployed in user devices). According to one aspect of the invention, an intelligent rules-engine on the enterprise side further extends this capability by using information concerning the availability and skills of a plurality of human contact agent to provide load balancing across a multi-vendor contact center environment. The intelligent rules-engine can advantageously also facilitate load balancing between individual instances of a single vendor's contact center solution deployed in multiple data centers. Such an intelligent rules-engine can leverage context information from a customer interaction with a web application and/or a visual IVR server to make more informed decisions about optimal routing of calls directed to a live response customer contact centers.

The inventive arrangements are described in detail below. However, one notable aspect of the system involves the use of a correlation identifier or correlation ID. The correlation ID is essentially a data value that is assigned to both the call and web/mobile application. Once assigned, the correlation ID serves as a common session identifier to track a user session as the user transitions through the various phases of interaction with the host enterprise and one or more contact centers. The provision and use of this common session identifier provides numerous advantages.

Figure 2:
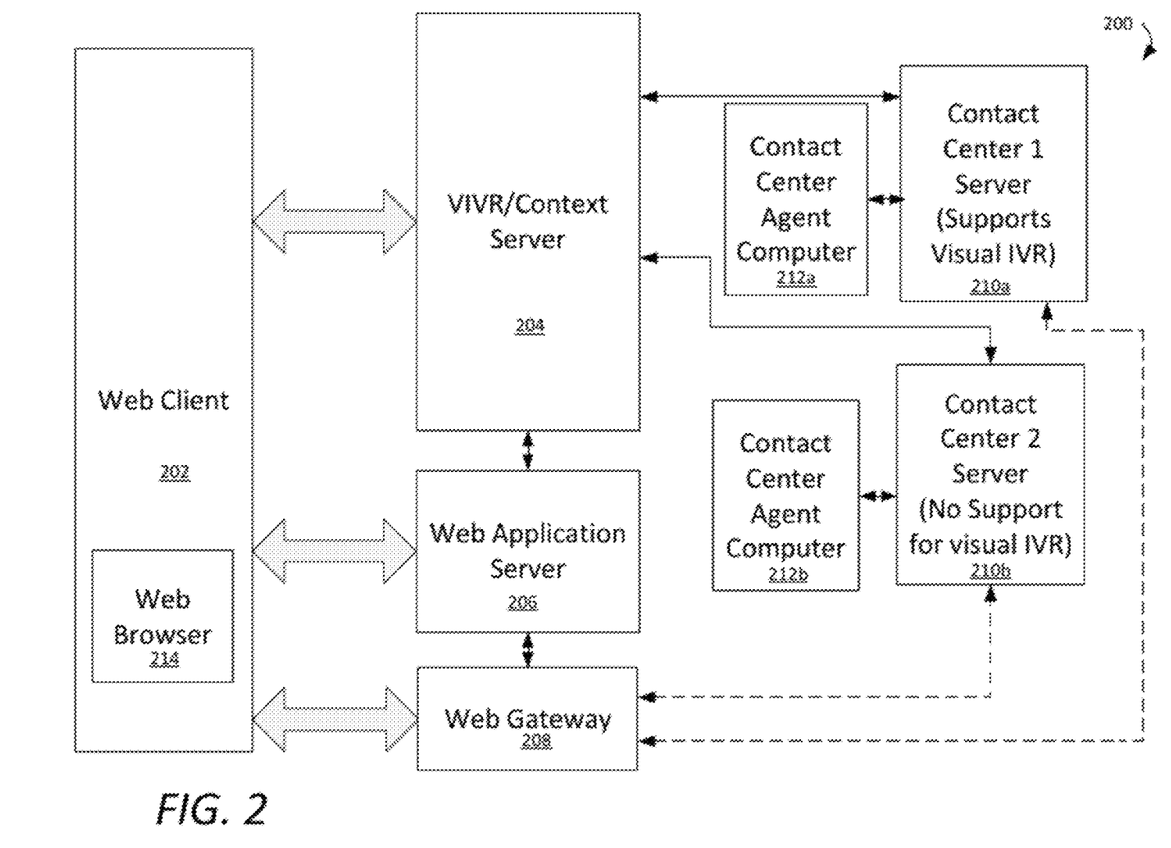
FIG. 2 is a drawing that is useful for understanding an enterprise host computer system for customer contact.

FIG. 2 is a drawing that is useful for understanding a computer system architecture which facilitates managing and sharing of data and media as between mobile/web applications and a corporate contact center. The architecture shown in FIG. 2 allows a system in which a generic client side API can be used in conjunction with a set of back end frame-works to support disparate contact center solutions. With such an arrangement, a single client-side application can support multiple vendor solutions. The inventive arrangements also allow an enterprise to leverage an instance of a visual IVR server deployed as described herein, such that the visual IVR server can be used advantageously with contact center solutions that do not necessarily provide access to their IVR scripts.

Further, the inventive arrangements allow a visual IVR server to intelligently route customer calls to an available agent across multiple contact centers (potentially using different vendor technology). This is advantageously accomplished using context data derived from customer interactions with a web client and/or visual IVR server, in conjunction with agent availability statistics and/or contact center capabilities. In this way, context information from a customer interaction with a web application and/or a visual IVR server is used make more informed decisions about optimal routing of calls directed to a live response customer contact centers. Those skilled in the art will appreciate that the computer system architecture illustrated in FIG. 2 is one possible example of a computer system which can be used for purposes of implementing the inventive arrangements. However, the invention is not limited in this regard and any other suitable computer system architecture can also be used without limitation.

Elements of the system which are shown in FIG. 2 include a web client 202, a VIVR/context server 204, a web application server 206, an SIP web gateway 208, a first contact center server 210a and a second context center 210b. Also shown in FIG. 2 are contact center agent computers 212a, 212b which are respectively associated with contact center servers 210a, 210b. The contact center agent computers facilitate contact agent voice/video calls with a web client 202 using a communication protocol as described below. The web client 202, contact center servers 210a, 210b and contact center agent computers 212a, 212b can communicate with the VIVR/context server 204, web application server 206 and SIP web gateway 208 over a network such as the Internet or an intranet. Suitable communication paths are also provided as between the web application server 206 and SIP web gateway 208.

The web client 202 is a client computer system comprised of a combination of hardware and software elements capable of carrying out the functions and operations described herein. The hardware associated with web client 202 can include without limitation a personal computer, a tablet computer, a personal digital assistant and/or a smart-phone. The web client will also include an operating system (not shown) and suitable software, such as a web browser 202 that is capable of communicating HTTP requests to web servers. The web browser 214 will support various web services and standards which are useful for carrying out the functions and operations described herein. For example, the browser provided in web client 202 can support real time communications by means of a supported API such as WebRTC. The web browser can also support user and device authentication, static and dynamic displays associated with web pages, file transfers and so on. As will be appreciated by those skilled in the art, many combinations of hardware and software are possible for purposes of implementing the web client.

The VIVR/context server 204 is a server computer system comprised of a combination of hardware and software for serving web pages, voice data and other information to web clients for purposes of implementing a visual interactive voice response (visual IVR) system. A VIVR session implemented by the VIVR/context server 204 will generally rely on IVR scripts defined by a contact center server (e.g. contact center server 210a) for purposes of implementing a visual IVR session. The VIVR/context server will generate and serve one or more web pages to the web client 202 which allow the web client user to visually navigate through an IVR script and more quickly access the information or assistance they require. In order to implement such a visual IVR interaction, the IVR scripts of a particular customer contact center can be accessed in real time by the VIVR/context server 204. Alternatively, the IVR scripts can be preconfigured in the VIVR/context server in advance of a user VIVR session by accessing IVR scripts stored in the contact center server. In either case, the contact center's IVR scripts (which are normally communicated to customers using audible media over telephony (and responded to by customers using DTMF tones) are instead used by the VIVR/context server to facilitate a visual IVR session delivered through a series of web pages. As a result of this interactive session, the VIVR/context server 204 will provide information or resources as requested by a web client user. Alternatively, during the course of the VIVR session, the VIVR/context server may respond to a user request to speak to a live operator or agent at a customer contact center 210a, 210b.

During the VIVR session, a user can navigate through one or more web pages (e.g., using a web browser) served by the VIVR/context server, and may input data as necessary. More particularly, the user can input data into a web client device 202 and such data will be communicated to the VIVR/context server 204 during the interactive VIVR session.

Alternatively, a user can interact with a mobile application executing on the mobile web client device 202. In that case, the VIVR/context server 204 can facilitate an interactive session with the user which is facilitated using the mobile application rather than the browser. For convenience, the invention shall be described in the context of a browser scenario, but it should be understood that the same concepts can be extended for use with other types of mobile device web applications.

Those skilled in the art will appreciate that the VIVR/context server 204 can receive HTTP requests from the web client 202 and translate received URL requests to identify specific web pages which are to be served to the web client. The VIVR/context server 204 can also support various web services and standards which are useful for carrying out the functions described herein. For example, the server can support authentication of web clients, file transfer and so on. Further, the VIVR/context server can communicate with contact center servers 210a, 210b for requesting and receiving data (e.g. data concerning IVR scripts) as hereinafter described. Further the VIVR/context server can implement a context sensitive rules engine as hereinafter described.

Web application server 206 executes a web software application which can be accessed by one or more web clients 202 and one or more contact center agent computers 212a, 212b for carrying out the methods described herein. The web application server is accessed by web clients and the contact center using suitable network communications methods. The web application server can serve web pages to web client 202. For example, the web application server 206 can receive HTTP requests from the web client 202 and can translate received URL requests to identify specific web pages which are to be served to the web client. The web application server 206 can also support various web services and standards which are useful for carrying out the functions described herein. For example, the web application server can support authentication of web clients, file transfer and so on.

The web application server 206 can be configured to facilitate a customer interaction, such as user self-help session. In such a session, the web application server can serve suitable web pages to the web client for the interactive session. The user can navigate through one or more web pages (e.g., using a web browser) and input data as necessary during the interactive session. More particularly, the user can input data into a web client device and such data will be communicated to the web application server 206 during the interactive session. Alternatively, a user can interact with a mobile application executing on the mobile web client device. In that case, the web application server can facilitate an interactive session with the user which is facilitated using the mobile application rather than the browser.

SIP Web gateway 208 is comprised of hardware and/or software that normalizes the signalling between SIP-based devices and WebRTC-based applications so the two can communicate together seamlessly. Accordingly, the SIP web gateway 208 can facilitate the initiation of a communication session (such as a voice call or video call) as between the web client 202 and one or more contact centers 210a, 210b. In this regard it will be appreciated that the contact centers 210a, 210b can each be comprised of an SIP type contact center that utilizes the widely known Session Initiation Protocol (SIP) for controlling and implementing voice and/or video calls with a web client through SIP web gateway 208.

As noted above, the web browser 214 (or mobile web application) can support real time communications by means of a suitable API such as WebRTC. A WebRTC enabled browser allows users to initiate both voice and video communications between two different web browsers with no additional client or plug-in required. Alternatively, the web browser could offer a "click to call" capability that allows the user to utilise a smart-phone or land-line phone as depicted by items 106 and 108 in FIG. 1

Figure 3:
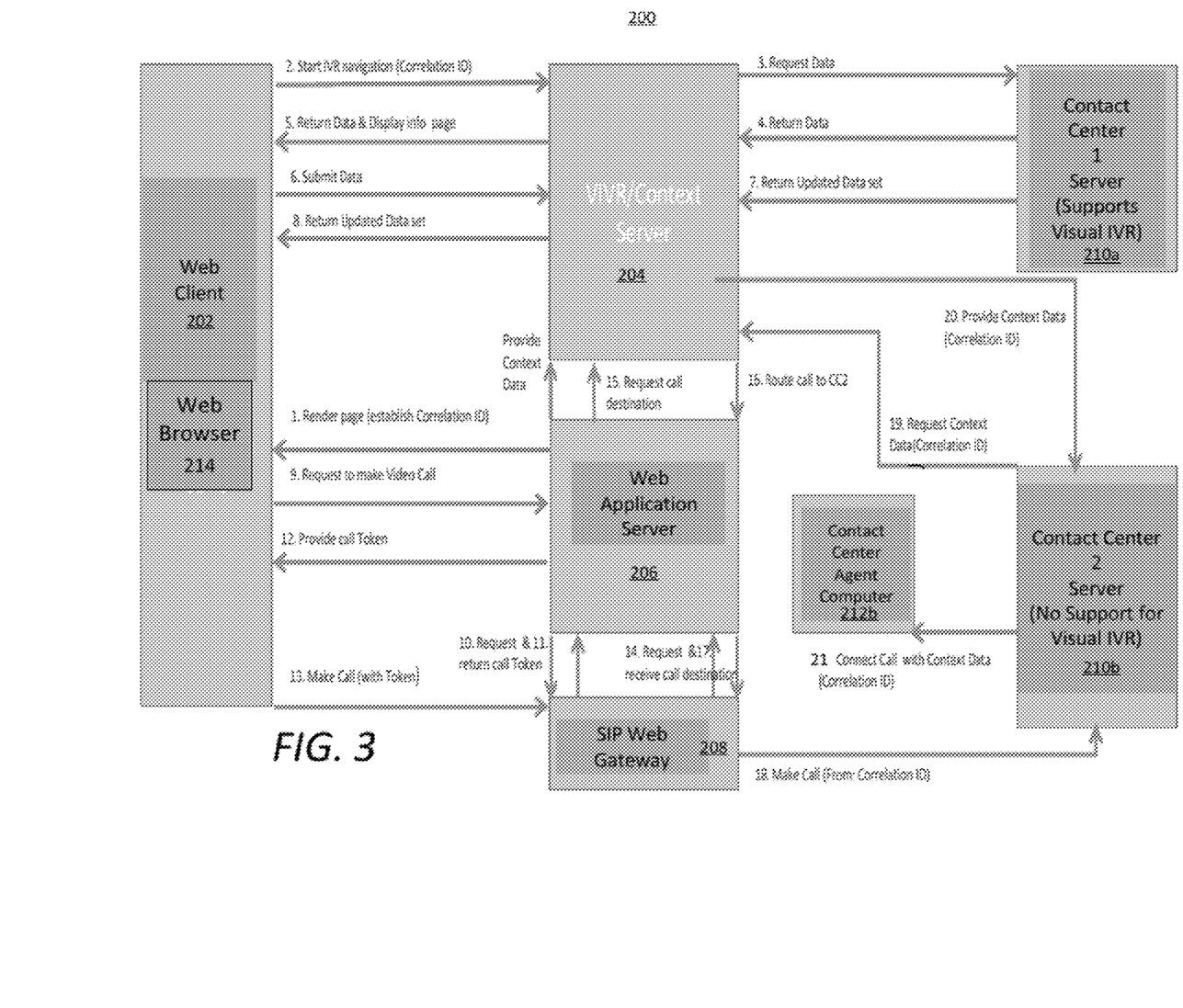
FIG. 3 is a drawing that is useful for understanding how the host computer system in FIG. 2 can perform intelligent load balancing as between the different vendor solutions based on queue statistics and can facilitate a contact center vendor agnostic scenario insofar as it enables mixing of disparate contact center technologies.

Referring now to FIG. 3, there is shown a flow diagram that is useful for understanding the inventive arrangements. The process can begin at step 1 when the web application 206 serves or renders a web page to the web client 202. For example, the web page can be served in response to a user navigating a web browser to a web address associated with the host contact center. When the web page is rendered to the web client, a correlation ID value is established for the session. For example, the web application server 206 can determine and assign the correlation ID value. The correlation ID value can be generated by any suitable method provided that the value is capable of uniquely identifying the communication session with the host system 200 relative to all other communication sessions established by other web clients with such host system. As an example, the correlation ID value can comprise a numeric or alpha-numeric value. Thereafter, such correlation ID will be known to the web application server 206 and the web client. The correlation ID is stored in a suitable memory location by each of the web application server and the web client to facilitate additional functions as hereinafter described.

Following step 1, the user can continue engaging in an interactive communication session with the web client server. Such a session will generally involve the web application server 206 executing certain scripts and programming logic which will cause the web application server to serve one or more web pages to the web client 202. As part of this process, the user may provide one or more user inputs and/or data at the web client 202 and these inputs can be communicated to the web application server 206. User inputs and other information pertaining to the session may be stored in memory at the web application server together with information specifying the correlation ID for the session. For example, during the communication session, the user may enter personal identification information, purchase preferences, language preferences, and so on.

At some point in the communication session with the web application server 206, after the correlation ID has been established, the customer or user will request in step 2 an IVR navigation session with VIVR/context server 204. The request communicated to the VIVR/context server 204 will specify the previously assigned correlation ID, which information can be stored by the VIVR/context server in a suitable location. As a result of the request in step 2, the VIVR/context server 204 will begin a VIVR navigation session.

Throughout a communication session as described herein, the correlation ID value can be used as a mechanism to identify a particular session and allow each component of the host system to have improved knowledge of a context of each call. The following steps are useful for understanding one exemplary way in which the correlation ID value could be used in a host system 200 as described herein. However, it should be appreciated that a correlation ID value can be used in many ways and the invention is not limited to the particular use cases which are described below.

During the navigation session, the VIVR/context server 204 may request data (e.g. VIVR script information data) from the contact center server 210a. This action is shown as step 3 in FIG. 3. In response to the data request, the contact center server will communicate return data to the VIVR/context server as shown in step 4. The VIVR/context server will then render a suitable VIVR information web page to the web client in step 5, including any data provided by the contact center server. The VIVR navigation session can continue in step 6, where the user enters certain data (e.g. authentication data) and the web client 206 communicates such data to VIVR/context server 204. During the navigation session, the contact center server 210a may return additional updated data (e.g. additional data for implementing a visual IVR script) to the VIVR/context server and this data will be communicated to the web client 202 as part of the visual IVR session as shown in step 8. This interactive process can continue during the communication session as the user interacts with the VIVR/context server 204 to obtain particular host services that are desired.

At a certain point in the VIVR navigation session, the customer or user may decide that they need to speak directly with a human contact center agent. At this point, the customer or user can interact with the web client 202 to indicate their desire to initiate a communication session. The communication session could be a voice call or a video call, but for purposes of this discussion it shall be assumed that a video call is desired. The web client will then communicate in step 9 to the web application server 206 to request set-up of the video call. However, it should be noted that during the course of the communication session with VIVR/context server 204 and web application server 206 a significant amount of context information is often collected. This information can range from the identity of the person calling, their reasons for their call, their purchase interests, their preferred language, and so on. This information can be useful in the next several steps as hereinafter described for purposes of routing a call to a particular contact center.

In order to facilitate the call to a contact center, the web application server 206 will in step 10 request a call token from the SIP web gateway 208. The SIP web gateway will respond in step 11 by returning a call token to the web application server. The call token provided will be a suitable data element (e.g. an alpha-numeric data element) which is required for placing a call through the SIP web gateway 208. The web application server will know the correlation ID of the particular web client with which it is communicating. Accordingly, the web application server 206 will be aware of which token has been assigned to the particular web client and this information can be stored at the web client. In step 12, the web application server 206 will communicate the call token to the web client 202, which will in turn use the call token to initiate a video call in step 13. More particularly, in step 13 the web client 202 will communicate the call token to the SIP web gateway 208 as part of the call initiation process.

Upon receipt of the call token, the SIP web gateway will in step 14 request from the web application server 206 information concerning the particular contact center 210a, 210b to which the call is to be routed. The particular call/web client can be identified to the web application server by means of the call token. The particular call token assigned in step 12 will be recognized as one which was previously assigned to a particular web client 202 (which has also been assigned a correlation ID value for the current communication session). In step 15, the web application server 206 will pass this request on to the VIVR/context server 204. At this point, the significant amount of previously gathered information concerning call context can be highly useful for purposes of optimal call routing. The selection of the preferred contact center to which the call is to be routed can be based on context data. Notably, the web application server can perform a look-up to determine a particular correlation ID value of the web client to which the call token was previously provided. This correlation ID can be communicated to the VIVR/context server 204. Thereafter, the VIVR/context server can use the particular correlation ID to determine which contact center 210a, 210b the call should to be routed. The VIVR/context server can utilize the context data collected by during the visual IVR session, and during the communication session with the web application server to make decisions concerning call routing. Thereafter, in step 16, the VIVR/context server 204 will communicate the information concerning the selected contact center to the web application server 206.

In step 16, the VIVR/context server 204 communicates to web application server 206 that the call initiated by the web client 202 is to be routed to contact center 210b. The web application server passes this information to the SIP web gateway 208 in step 17. Thereafter, in step 18 the SIP web gateway 208 sets up the video call with the contact center server 210b. The context data collected during the visual IVR session and during the communication session with the web application server can now serve a further purpose. In particular, the context data can be provided from the VIVR/context server to the contact center agent computer so that the agent can have a full understanding of the context of the call. The signalling involved with setting up the call will include a communication to the contact center server of the previously assigned correlation ID. Thereafter, in step 19, the contact center server 210b will communicate the correlation ID to the VIVR/context server 204 to obtain/request context information for the call. In response, the VIVR/context server in step 20 will provide all relevant information it may have concerning the communication session (i.e. context information) to contact center server 210b. This information is provided together with the correlation ID so that the contact center server will be able to identify the particular call to which the context data is being provided. Exemplary context data can include previously provided customer data, the length of time the customer has been interacting with the host system, purchase preferences, reasons for the call, previous interactions with the host system, credit card information and so on.

Finally, in step 21, the contact center server 210b will connect the call from the web client to a particular contact agent computer so that the call can be handled by a contact agent. At this point in the process, the contact agent can participate in a video communication session with the user of the web client device. As part of the call set-up process, the contact center server 210b will provide the contact center agent computer with the correlation ID. Thereafter, the contact center agent computer 210b can use the correlation ID as a contextual reference when communicating with other devices in the system. For example, the contact center agent computer can include the correlation ID in a communication if it needs to request additional information from the VIVR/context server.

The computer architecture shown and describe herein allows intelligent routing of calls to a plurality of customer contact centers. The selection of the contact center to which a call is to be routed can be based on any suitable criteria, including context data gathered during the course of the earlier interactive communication sessions with VIVR/context server and web application server. This information is always accessible based on the correlation ID assigned to a particular communication session. In a very simple example, a particular contact center can be selected for receiving a call by means of a suitable load balancing algorithm which attempts to balance the number of calls which are routed to each of the various call centers 210a, 210b. Such an arrangement can be enhanced by using the VIVR/context server to access load data from a plurality of call centers, which data can then be used when making a call routing decision. Alternatively, the selection of the contact center to which the call is routed can be based upon the particular function or capabilities of a particular call center (e.g., a billing inquiry versus a warranty inquiry). As a further alternative, the contact center to which the call is routed can be based on the skill set of one or more contact center agents who are present in a particular call center. Notably a required skill set for a particular call can be derived from the context data collected during an earlier communication session as described above.

The VIVR/context server can choose a particular contact center based upon any type of context data associated with a particular communication session. For example, the VIVR/context server will be aware that the web client 202 assigned to a particular correlation ID value is making use of the host's visual IVR system. The VIVR/context server will also be aware that only contact center 1 is capable of supporting visual IVR. Accordingly, there may be some scenarios where the VIVR/context server will direct SIP web gateway to connect a call to the contact center 1 (210a) so that the contact center can continue to support the visual IVR functions of the call as the contact center agent 212a communicate with a user. Alternatively, if no further visual IVR support is anticipated, then call could be instead directed to contact center 2 (which does not support visual IVR). In this way, the load on each contact center can be more evenly distributed. It should be understood that the invention is not limited to the particular contact center selection methods described herein. For example, a computer algorithm implemented in the web application server and/or in the VIVR/context server can chose a call center to which a call is routed based upon two or more of the foregoing considerations. The important thing to note is that the architecture of the system and the context data facilitate intelligent call routing. The VIVR/context server can also serve to facilitate a single common web client that is capable of interacting with a plurality of contact center servers using somewhat different technologies. The web application server and VIVR/context server provide a generic interface to the web client and isolate the web client from the unique technology requirements of the disparate contact centers.

Example 1

In a first scenario, a customer uses an enterprise web/mobile application (i.e. uses web client 202 and web application server 206) and invokes an API to enable the application to provide a graphical display of the enterprise IVR script. For purposes of this example, it is assumed that the enterprise has two contact center technologies deployed (contact centers 210a, 210b), such that each contact center 210a, 210b utilizes a different technology. Further assume that only one of the contact centers (210a) provides a mechanism to access the IVR scripts for graphical representation. As both systems provide the same underlying service, the VIVR/context server 204 is configured to utilize the interface provided by the contact center 210a that supports access to its visual IVR scripts. The process basically follows steps 1-4 outlined above with respect to FIG. 3, thereby causing the VIVR/context server to retrieve the scripts from the appropriate contact center 210a as described. As per steps 4 and 5 above, the necessary web page data is returned to the web client 202 along with any visual hints and tips that should be displayed for implementing visual IVR. The process can continue with further exchanges of data (e.g. exchanges of data as per steps 6-8 above). Assume that at some point in the interaction the web client user or customer desires to be connected to a human agent. The web client then triggers the VIVR/context server to establish a call. In such a scenario, the web client 206 can generally follow steps similar to those described with respect to steps 9-15 above. At this point, the VIVR/context server determines which contact center 210a, 210b is most preferable to receive the call. For example, the VIVR/context server can query both contact centers 210a, 210b to determine which center has the lowest user load. Alternatively, the VIVR/context server can use a suitable load balancing algorithm to estimate or predict the contact center which currently has the lowest load of users being serviced by contact agents. Once the desired contact center is selected, the VIVR/context server communicates this information to the web application server 206 as per step 16. The SIP web gateway will ultimately be provided this information (as per step 17) and will respond by routing the call to the designated or selected contact center destination (step 18).

Example 2

Figure 4:
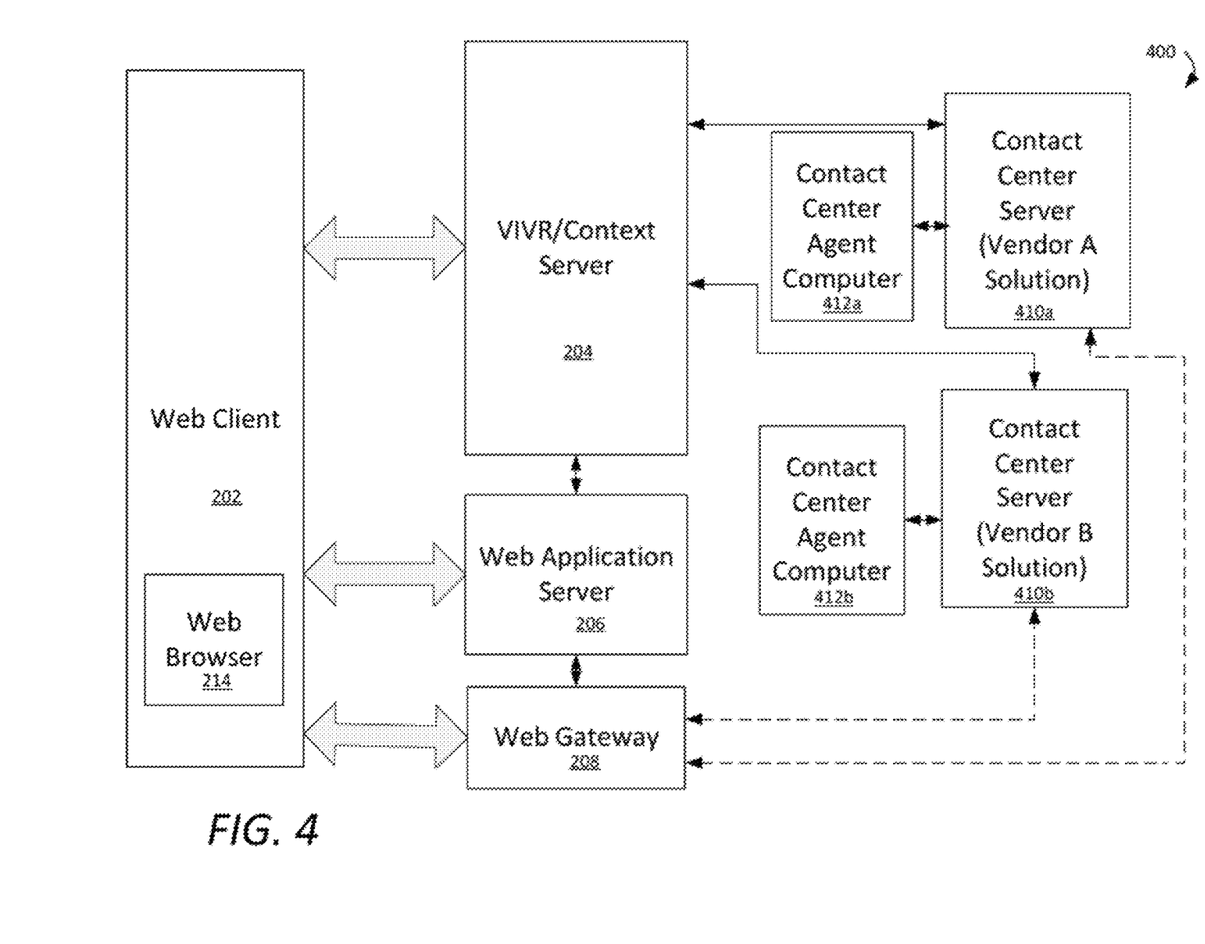
FIG. 4 is useful for understanding an alternative embodiment of the inventive arrangements in which context information is shared as between a first and second contact center using different technologies provided by two different technology vendors.

FIG. 4 shows a host system similar to that in FIGS. 2 and 3, in which like elements are identified using the same reference numbers as above. The enterprise, through a series of acquisitions, has vendor A's contact center solution (including contact center server 410a) to support its home insurance business. The enterprise has Vendor B's contact center solution (including contact center server 410b) to support its life insurance business. A customer is using the enterprise web/mobile application (i.e., web client 202 and web application server 206) to investigate home insurance. At some point in the communication session, the customer requests to be connected with a human contact agent. By using the context data, the VIVR/context server 204 determines that the call should be routed to contact center server 410a because the customer has expressed an interest in home insurance. The web/mobile application uses a context-aware rules engine provided by intelligent VIVR/context server 205 to route the customer communication session and any relevant contextual data to a contact center agent computer 412a where a contact center agent provides support to the user. Contact center agent computer 412a communicates with contact center server 410a. After purchasing the home insurance through the contact center agent at computer 412a, the customer wishes to talk to a contact center agent about life insurance. Contact center A does not support the life insurance business. Accordingly, the agent uses contact center agent computer 412a to inform the VIVR/context server that a call needs to be transferred. The rules engine provided by the context server ensures that the call is connected to Vendor B's solution and all relevant data that has been captured during the communication session is passed to the new contact center. The same or similar techniques can be used in other scenarios. For example, the foregoing methods could be used where an enterprise has a web/mobile application contact center solution deployed in Mumbai and in Bangalore and would like both to support a web/mobile application.

From the foregoing it will be appreciate that the inventive arrangements provide a host solution which is vendor agnostic insofar as it enables mixing of disparate contact center technologies. The system can also provide intelligent load balancing as between the different vendor solutions based on queue statistics. The system further enables intelligent balancing between data center installations of single vendor solutions by having agent queue information available to the load balancer.

The present invention can take the form of a computer program product on a computer-readable storage medium (for example, a hard disk or a CD-ROM). The computer-readable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. A method for load balancing and sharing of context information in an enterprise computer system including a plurality of customer contact centers, comprising:
   providing a plurality of contact centers, each respectively supported by a contact center server and one or more agent computers, the contact centers arranged to support at least one of voice and video communications between a plurality of live customer agents utilizing the agent computers at the contact centers and a plurality of customers using web client devices;
   providing a web application server executing a web application configured for conducting a web application communication session during which users of the web client devices submit user data to the web application server while requesting services or information from the web application server;

providing a VIVR/context server in communication with the web application server and the contact center servers, the VIVR/context server arranged to use IVR scripts of the plurality of contact center servers to support a visual IVR session during which a web client can engage in a visual presentation to facilitate selection of services or information provided by the plurality of contact centers;

receiving during at least one of the web application session and the visual IVR session, a user request for an audio or video communication session with one of said live customer agents; and using context data acquired during at least one of the web application communication session and during the visual IVR session to improve system performance during a continuation of the communication session with a different portion of the enterprise computer system.

2. The method according to claim 1, further comprising, responsive to the user request, selectively determining one of the plurality of call centers to which the audio or video communication session is to be connected.

3. The method according to claim 2, further comprising transferring the audio or video communication session to a second contact center so that the user can speak with a second live agent, and sharing the context data with a computer server associated with the second contact center.

4. The method according to claim 2, wherein the selection of one of the plurality of call centers is based on call center loading.

5. The method according to claim 4, wherein the selection of one of the plurality of call centers is based on queue statistics.

6. The method according to claim 2, wherein the selection of one of the plurality of call centers is based on a customer service requirement of the communication session determined by the context information.

7. The method according to claim 2, wherein the selection of one of the plurality of call centers is based on the technical capability requirement of the communication session determined by the context information.

8. The method according to claim 2, wherein the selection of one of the plurality of call centers is based on the IVR capability of the communication session.

9. The method according to claim 1, further comprising associating the context information acquired during the web application communication session or during the visual IVR session with a correlation ID and sharing the context information with a selected contact center to which the video or audio call has been routed based on the correlation ID.

10. The method according to claim 9, further comprising gathering additional context data during the audio or video communication session with one of the customer agents and associating the additional context data with the correlation ID.

11. A system for load balancing and sharing of context information in an enterprise computer system including a plurality of customer contact centers comprising:

a plurality of contact centers, each respectively supported by a contact center server and one or more agent computers, the contact centers arranged to support at least one of voice and video communications between a plurality of live customer agents utilizing the agent computers at the contact centers and a plurality of customers using web client devices;

a web application server executing a web application configured for conducting a web application communication session during which users of the web client devices submit user data to the web application server while requesting services or information from the web application server;

a VIVR/context server in communication with the web application server and the contact center servers, the VIVR/context server arranged to use IVR scripts of the plurality of contact center servers to support a visual IVR session during which a web client can engage in a visual presentation to facilitate selection of services or information provided by the plurality of contact centers;

wherein the enterprise computer system is configured to receive, during at least one of the web application session and the visual IVR session, a user request for an audio or video communication session with one of said live customer agents; and use context data acquired during at least one of the web application communication session and during the visual IVR session to improve system performance during a continuation of the communication session with a different portion of the enterprise computer system.

12. The system according to claim 11, wherein the enterprise computer system is further configured to selectively determining one of the plurality of call centers to which the audio or video communication session is to be connected.

13. The system according to claim 12, wherein the enterprise computer system is further configured to transfer the audio or video communication session to a second contact center so that the user can speak with a second live agent, and share the context data with a computer server associated with the second contact center.

14. The system according to claim 12, wherein the enterprise computer system is further configured to select of one of the plurality of call centers based on call center loading.

15. The system according to claim 12, wherein the enterprise computer system is further configured to select of one of the plurality of call centers based on a customer service requirement of the communication session determined by the context information.

16. The system according to claim 12, wherein the enterprise computer system is further configured to select of one of the plurality of call centers based on the technical capability requirement of the communication session determined by the context information.

17. The system according to claim 12, wherein the enterprise computer system is further configured to select of one of the plurality of call centers based on the IVR capability of the communication session.

18. The system according to claim 11, wherein the enterprise computer system is further configured to associate the context information acquired during the web application communication session or during the visual IVR session with a correlation ID and share the context information with a selected contact center to which the video or audio call has been routed based on the correlation ID.

19. The system according to claim 18, wherein the enterprise computer system is further configured to gather additional context data during the audio or video communication session with one of the customer agents and associate the additional context data with the correlation ID.

20. The system according to claim 11, wherein the VIVR/context server is configured to use IVR scripts based on different technologies utilized by the plurality of contact center servers.

\* \* \* \* \*